FRIDLEY & CORNMAN.
Fruit Can.
No. 25,894.
Patented Oct. 25, 1859.
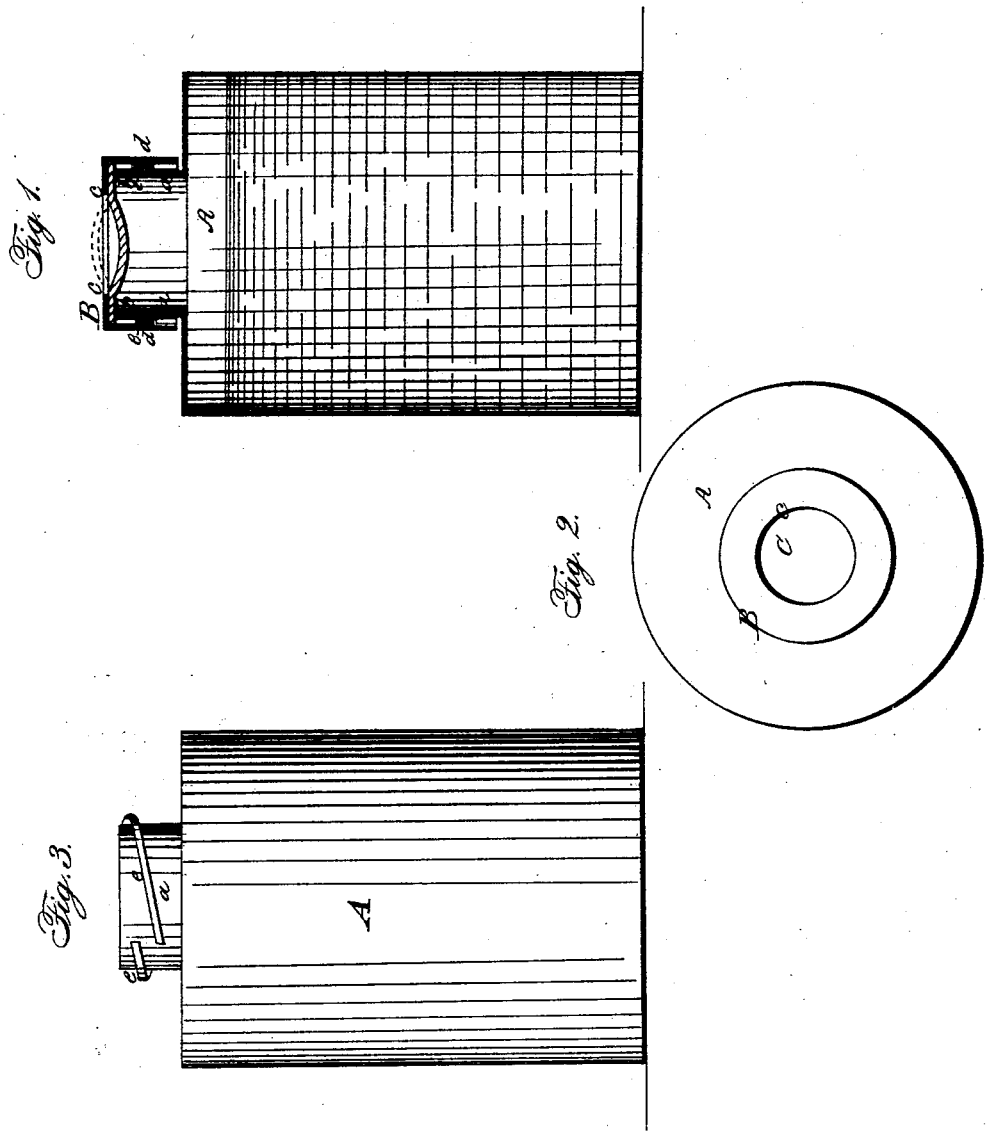
Witnesses:
D. Smith
A. Kerr
Inventor:
William Fridley
Frederick Cornman

UNITED STATES PATENT OFFICE.

WM. FRIDLEY AND FREDK. CORNMAN, OF CARLISLE, PENNSYLVANIA.

IMPROVEMENT IN PRESERVE-CANS.

Specification forming part of Letters Patent No. 25,894, dated October 25, 1859.

*To all whom it may concern:*

Be it known that we, WILLIAM FRIDLEY and FREDERICK CORNMAN, of Carlisle, in the county of Cumberland and State of Pennsylvania, have invented a new and useful Improvement in Cans and other Vessels for Preserving Fruits and other Substances; and we do hereby declare that the following is a full, clear, and exact description of the same, reference being had to the accompanying drawings, forming part of this specification, in which—

Figure 1 is a central vertical section of a fruit-can with our improvement. Fig. 2 is a top view of the same. Fig. 3 is an outside view of the can without the cover.

Similar letters of reference indicate corresponding parts in the several figures.

Our invention consists in the combination of a certain construction of the cover of a can or other vessel for preserving fruits and other substances, and a certain mode of applying a gasket of india rubber, gutta-percha, or other flexible and impervious material between the said cover and the mouth of the vessel, as hereinafter described, whereby provision is made for closing the vessel perfectly tight, and also for showing the condition of the contents.

To enable others to make and use our invention, we will proceed to describe its construction and operation.

A in the drawings is the body of the vessel; $a$, the neck, and $b\ b$ the mouth.

B is the cover, made in the form of a cap, fitting over the neck, and having a large hole, $c\ c$, in the center of its head. This cover is provided internally with two lugs, $d\ d$, to pass under two spiral projections or screw-threads, $e\ e$, on the exterior of the neck, so that by putting it on the neck and turning it round the lugs will pass under the said spiral projections or threads and draw the cover down upon the gasket C, which is applied between the upper margin of the mouth $b\ b$ and the head of the cover, and so compress the gasket in such a manner that it forms a perfect air-tight joint all round the mouth.

The gasket C consists of a circular piece of india-rubber, gutta-percha, or other suitable air-tight packing material, without any opening, of a size to fit the interior of the head or cover. The gasket is placed in the cover before it is applied to the body of the vessel, and when the cover is applied, after the filling of the vessel and the expulsion of the air, the gasket is clamped tightly around the edges, and so made to exclude the external atmosphere. When the contents of the vessel have cooled, and a partial vacuum has been thereby produced below the cover by condensation, the gasket is made, by the pressure of the external atmosphere, to sink into the mouth and to present, externally, a concave suface, as shown in black outline in Fig. 1, and so remains while the contents of the can are in good condition; but in case of fermentation occurring in the vessel the gases generated will soon overcome the pressure of the atmosphere and force the gasket outward through the opening, giving it a convex form externally, as shown in red outline in Fig. 1; and hence the gasket, visible through the opening in the cover, constitutes not only a packing between the can and cover, but virtually a portion of the cover and an index to the condition of the contents.

What we claim as our invention, and desire to secure by Letters Patent, is—

The employment of a perforated cover, B, in combination with a gasket, C, and mouth $b\ b$, as herein shown and described, so that the gasket constitutes virtually a portion of the cover of and an index to the condition of the contents of the vessel.

WILLIAM FRIDLEY.
FREDERICK CORNMAN.

Witnesses:
 DAVID SMITH,
 ANDREW KERR.